US011635378B1

(12) United States Patent
Ruckh et al.

(10) Patent No.: US 11,635,378 B1
(45) Date of Patent: Apr. 25, 2023

(54) METHOD FOR INCREASING SENSOR RESOLUTION BY SPECTRALLY STACKING RESPONSIVE DYES

(71) Applicant: Verily Life Sciences LLC, Mountain View, CA (US)

(72) Inventors: Timothy Tordella Ruckh, Mountain View, CA (US); Zhan Wang, Redwood City, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 380 days.

(21) Appl. No.: 17/074,390

(22) Filed: Oct. 19, 2020

Related U.S. Application Data

(62) Division of application No. 14/948,154, filed on Nov. 20, 2015, now Pat. No. 10,845,305.

(51) Int. Cl.
*G01N 21/64* (2006.01)

(52) U.S. Cl.
CPC ....... *G01N 21/6428* (2013.01); *G01N 21/645* (2013.01); *G01N 2021/6432* (2013.01); *G01N 2021/6439* (2013.01); *G01N 2201/061* (2013.01)

(58) Field of Classification Search
None
See application file for complete search history.

(56) References Cited

U.S. PATENT DOCUMENTS

| | | | |
|---|---|---|---|
| 5,364,797 A | 11/1994 | Olson et al. | |
| 6,268,222 B1 | 7/2001 | Chandler et al. | |
| 6,379,969 B1 | 4/2002 | Mauze et al. | |
| 6,608,189 B1 | 8/2003 | Tsien et al. | |
| 6,627,449 B1 | 9/2003 | Tsien et al. | |
| 6,682,938 B1 | 1/2004 | Satcher, Jr. et al. | |
| 7,514,267 B1 | 4/2009 | Lopez et al. | |
| 7,754,907 B2 | 7/2010 | Mirkin et al. | |
| 9,439,983 B1 | 9/2016 | Ruckh et al. | |
| 9,498,545 B1 | 11/2016 | Kam et al. | |
| 10,105,080 B1 | 10/2018 | Kam et al. | |
| 10,845,305 B1* | 11/2020 | Ruckh | G01N 21/645 |
| 2002/0012923 A1 | 1/2002 | Barenholz et al. | |
| 2002/0106326 A1 | 8/2002 | Singaram et al. | |
| 2005/0123563 A1* | 6/2005 | Doranz | C07K 16/2851 435/5 |
| 2006/0211075 A1 | 9/2006 | Lawrence et al. | |
| 2007/0269902 A1 | 11/2007 | Beechem et al. | |
| 2008/0188722 A1 | 8/2008 | Markle et al. | |
| 2008/0242806 A1* | 10/2008 | Chen | C08L 71/02 526/260 |
| 2010/0196918 A1 | 8/2010 | Ellis et al. | |
| 2013/0244250 A1 | 9/2013 | Yang et al. | |
| 2015/0030544 A1 | 1/2015 | Clark et al. | |
| 2015/0152322 A1* | 6/2015 | Nakayama | C09K 9/02 428/402 |
| 2015/0346198 A1 | 12/2015 | Naumann et al. | |
| 2016/0146799 A1 | 5/2016 | Robinson et al. | |
| 2016/0245831 A1 | 8/2016 | Yang et al. | |
| 2016/0274030 A1 | 9/2016 | Ruckh et al. | |

OTHER PUBLICATIONS

Myochin, T., et al., "Rational Design of Ratiometric Near-Infrared Fluorescent pH Probes with Various pKa Values, Based on Aminocyanine," J. Am. Chem. Soc., vol. 133, No. 10, p. 3401-3409 (2011).
Radu A., et al., "Shifting the Measuring Range of Chloride Selective Electrodes and Optodes Based on the Anticrown Ionophore [9]Mercuracarboand-3 by the Addition of 1-Decanethiol" Chemia analityczna, vol. 50, No. 1, p. 71-83 (2005).
Lindfors, T., et al., "Polyaniline as pH-sensitive component in plasticized PVC membranes," Journal of Electroanalytical Chemistry, vol. 560, p. 69-78 (2003).
Berezin, Mikhail Y., et al., "Strategies for developing pH sensitive fluorescent probes," BiOS, International Society for Optics and Photonics, 2010.
http://www.berryassoc.com/prodetails.asp?product_number=BLU%2000652, Blueberry-C6-ester-652.
Korostynska, O., et al., "Review on State-of-the-art in Polymer Based pH Sensors," Sensors, vol. 7, p. 3027-3042 (2007).
Ruckh, T. T., et al., "Polymer-free optode nanosensors for dynamic, reversible, and ratiometric sodium imaging in the physiological range," Scientific Reports, vol. 3, p. 1-6 (2013).
Dubach, J.M., et al., "Fluorescent nanoparticles for the measurement of ion concentration in biological systems," J. Vis. Exp. vol. 53 (2011).
Zhu, M.Q. et al., "A stilbene-based fluoroionophore for copper ion sensing in both reduced and oxidized environments," Talanta, vol. 81, p. 678-683 (2010).
Ma, X, et al., "Ultra-pH-Sensitive Nanoprobe Library with Broad pH Tunability and Fluorescence Emissions," Journal of the American Chemical Society, vol. 136, p. 11085-11092 (2014).
Ji, Xin, et al., "On the pH-dependent quenching of quantum dot photoluminescence by redox active dopamine," Journal of the American Chemical Society vol. 134, No. 13 (2012): 6006-6017.

\* cited by examiner

*Primary Examiner* — Ann Montgomery
(74) *Attorney, Agent, or Firm* — McDonnell Boehnen Hulbert & Berghoff LLP

(57) ABSTRACT

An analyte-sensitive substance is provided that has an optical property related to the concentration of an analyte. The analyte-sensitive substance includes an ionophore or other substance configured to provide a local pH, within the analyte-sensitive substance, that is related to the concentration of the analyte proximate the analyte-sensitive substance. The analyte-sensitive substance further includes a pH-sensitive fluorophore that increases or decreases its intrinsic fluorescence intensity with the local pH across a specified range of pH values. The analyte-sensitive substance further includes a pH-sensitive quencher configured to increase the slope of the change of fluorescence intensity of the pH-sensitive fluorophore across the specified range of pH values. The analyte-sensitive substance may further include an ionic additive configured to adjust the local pH such that the specified range of pH values corresponds to a range of analyte concentration values of interest.

7 Claims, 6 Drawing Sheets

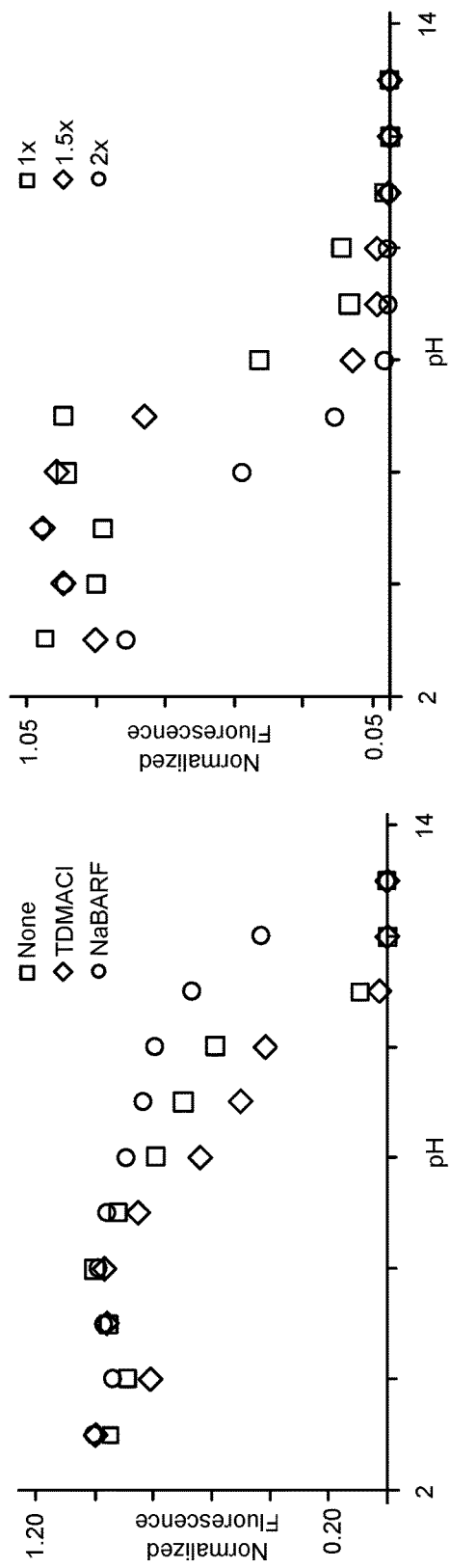
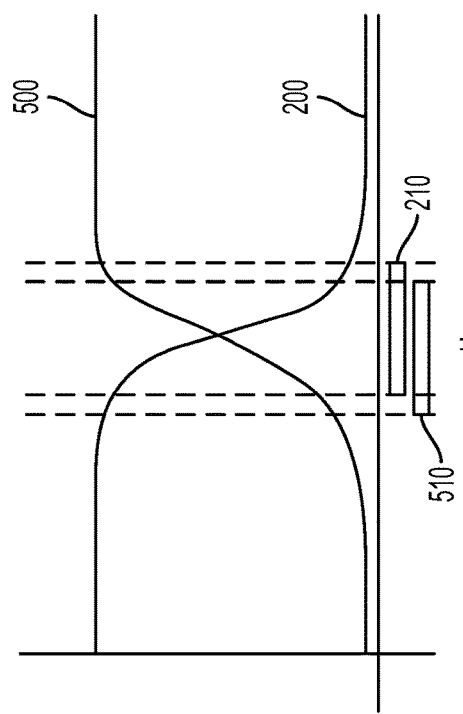
FIG. 4C
FIG. 4D
FIG. 5

METHOD FOR INCREASING SENSOR RESOLUTION BY SPECTRALLY STACKING RESPONSIVE DYES

CROSS-REFERENCE TO RELATED APPLICATIONS

This application is a division of U.S. patent application Ser. No. 14/948,154, filed Nov. 20, 2015, which is incorporated herein by reference.

BACKGROUND

Unless otherwise indicated herein, the materials described in this section are not prior art to the claims in this application and are not admitted to be prior art by inclusion in this section Certain medical conditions or states can be characterized by the concentration of a physiologically relevant analyte (e.g., glucose, an ion, a hormone) over a narrow range of concentrations. The concentrations of such analytes can be measured in a variety of ways. In some examples, a fluorophore or other optically active substance could be configured to have a physical property (e.g., a fluorescence intensity) that is related to the concentration of the analyte. For example, a fluorophore could be configured to selectively bind to an analyte of interest such that binding of the analyte quenches the fluorescence of the fluorophore. The fluorescence intensity of the fluorophore could be detected (e.g., by illuminating the fluorophore and detecting light responsively emitted from the fluorophore) and used to determine the concentration of the analyte. In another example, a fluorophore and a quencher could be maintained in proximity with each other by a third compound (e.g., a protein) such that the quencher quenches the fluorophore (e.g., via the Forster resonance energy transfer (FRET) process) when the analyte is not bound to the third compound. The third compound could be configured to separate the quencher and the fluorophore (e.g., to increase a fluorescence intensity of the fluorophore by reducing an amount of quenching by the fluorophore) when the analyte is bound to the third compound.

SUMMARY

Some embodiments of the present disclosure provide a sensor including an analyte-sensitive substance, wherein the analyte-sensitive substance includes: (i) an ionophore that is configured to provide a local pH within the analyte-sensitive substance related to a concentration of an analyte proximate the analyte-sensitive substance; (ii) a pH-sensitive fluorophore that is configured to fluoresce with a fluorescence intensity that increases or decreases as a function of the local pH over a range of pH values according to an intrinsic intensity function, wherein the intrinsic intensity function has a first rate of change of fluorescence intensity over the range of pH values; and (iii) a pH-sensitive quencher that is configured to quench the pH-sensitive fluorophore to an extent that increases or decreases as a function of the local pH within the range of pH values. The pH-sensitive fluorophore, in combination with the pH-sensitive quencher, is configured to fluoresce with a fluorescence intensity that increases or decreases as a function of the local pH over the range of pH values according to a quencher-modified intensity function. The quencher-modified intensity function has a second rate of change of fluorescence intensity over the range of pH values that is greater in magnitude than the first rate of change.

Some embodiments of the present disclosure provide a sensor including an analyte-sensitive substance, wherein the analyte-sensitive substance includes: (i) an ionophore that is configured to provide a local pH within the analyte-sensitive substance related to a concentration of an analyte proximate the analyte-sensitive substance; (ii) a pH-sensitive fluorophore that is configured to fluoresce with a fluorescence intensity that increases or decreases as a function of the local pH over a range of pH values according to an intrinsic intensity function, wherein the intrinsic intensity function has a first rate of change of fluorescence intensity over the range of pH values; and (iii) an ionic additive that is configured to one of raise or lower the local pH. An amount of the ionic additive in the analyte-sensitive substance is specified such that the range of pH values corresponds to a specified range of concentrations of the analyte proximate the analyte-sensitive substance.

Some embodiments of the present disclosure provide a method for forming an analyte-sensitive substance. The method includes (i) forming a first solution that includes (a) an organic solvent, (b) an ionophore that includes a hydrophobic substance and that is configured to provide a local pH within the analyte-sensitive substance related to a concentration of an analyte proximate the analyte-sensitive substance, and (c) a pH-sensitive fluorophore that includes a hydrophobic substance and that is configured to fluoresce with a fluorescence intensity that increases or decreases as a function of the local pH over a range of pH values according to an intrinsic intensity function, wherein the intrinsic intensity function has a first rate of change of fluorescence intensity over the range of pH values. The method further includes: (ii) combining the first solution and an aqueous solution, wherein at least one of the first solution or the aqueous solution includes an amphiphilic compound; and (iii) evaporating the organic solvent to form a plurality of nanoparticles, wherein each nanoparticle of the plurality of nanoparticles includes the pH-sensitive fluorophore and the ionophore enclosed within a layer of the amphiphilic compound.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 4C is a plot of experimentally determined fluorescence intensities of three different formulations of an analyte-sensitive substance.

FIG. 4D is a plot of experimentally determined fluorescence intensities of three different formulations of an analyte-sensitive substance.

FIG. 5 is an example plot of the fluorescence intensity of a further pH-sensitive fluorophore overlaid on the fluorescence intensity of the pH-sensitive fluorophore of FIG. 2.

DETAILED DESCRIPTION

Figure 1:
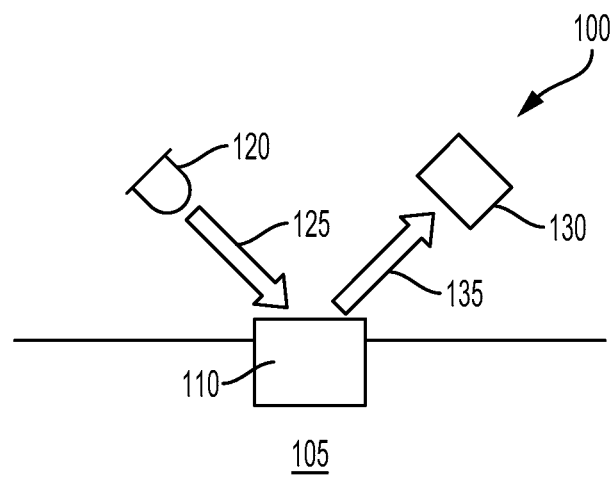
FIG. 1 is a schematic view of an example analyte sensor that includes an analyte-sensitive substance.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Some embodiments of the present disclosure provide a sensor configured to detect an analyte. The sensor includes an analyte-sensitive substance that can be optically interrogated to detect the concentration of the analyte in a fluid or other environment to which the analyte-sensitive substance is exposed. Optical interrogation of the analyte-sensitive substance includes illuminating the analyte-sensitive substance (e.g., with light at a specified wavelength) and detecting a property of light that is responsively fluorescently emitted from one or more fluorophores in the analyte-sensitive substance. The one or more fluorophores of the analyte-sensitive substance include a pH-sensitive fluorophore having a fluorescence intensity that is related to a local pH within the analyte-sensitive substance. The analyte-sensitive substance can further include a pH-transducing substance that affects the local pH such that the local pH is related to the concentration of the analyte. Alternatively, the analyte-sensitive substance could lack such a transducing agent and could be used to detect the pH of an environment of interest (that is, the analyte-sensitive substance could be configured to detect the concentration of hydrogen ions).

The pH-transducing substance could include a variety of proteins, compounds, enzymes, ionophores, or other substances configured to provide a local pH in the analyte-sensitive substance that is related to the concentration of an analyte. In some examples, the analyte is an ion (e.g., potassium, sodium, calcium) and the analyte-sensitive substance could include an ionophore (e.g., a crown ether, a calixarene, a cryptand) that is configured to selectively interact with and/or bind to the ion. The binding of the ion to the ionophore could attract or repel (depending on the charge of the analyte ion) hydrogen ions to change the local pH in a manner related to the concentration of the ion. Additionally or alternatively, the pH-transducing substance could be configured to provide a local pH in other ways. For example, the pH-transducing substance could include a protein or other substance configured to release a hydrogen ion when bound to an analyte. In another examples, the pH-transducing substance could include an enzyme or other substance configured to catalyze a reaction in the presence of an analyte (e.g., to catalyze the decomposition of the analyte), and products of such a reaction (e.g., hydrogen ions) could affect the local pH.

A pH-sensitive fluorophore of the analyte-sensitive substance is configured to fluoresce (that is, to emit fluorescent light in response to illumination having a specified wavelength or other specified property) with a fluorescence intensity that increases or decreases as a function of the local pH across a range of pH values according to an intrinsic intensity function of the pH-sensitive fluorophore. The intrinsic intensity function increases or decreases across the range of pH values according to a first rate of change. Thus, a change in the local pH within the range of pH values can be detected by detecting a change in the fluorescence intensity of the pH-sensitive fluorophore, e.g., by illuminating the analyte-sensitive substance with illumination at an excitation wavelength of the pH-sensitive fluorophore and detecting light responsively emitted from the analyte-sensitive substance with (e.g., detecting light at an emission wavelength of the pH-sensitive fluorophore). The sensitivity of the sensor to changes in the local pH, or to the concentration of an analyte that is related, by the action of a pH-transducing substance (e.g., an ionophore), to the local pH, can be related to the first rate of change of the intrinsic intensity function.

The sensitivity of the sensor can be increased by increasing the rate of change of the fluorescence intensity of the pH-sensitive fluorophore across the range of pH values. This can be accomplished by adding a pH-sensitive quencher to the analyte-sensitive substance. The pH-sensitive quencher is configured to quench the pH-sensitive fluorophore to an extent that increases or decreases across the range of pH values. This pH-dependent quenching changes across the range of pH values such that the pH-sensitive fluorophore, in combination with the pH-sensitive quencher, fluoresces with a fluorescence intensity that increases or decreases as a function of the local pH across the range of pH values according to a quencher-modified intensity function. The amounts, concentrations, relative locations, emission spectra, excitation spectra, or other properties of the pH-sensitive fluorophore and pH-sensitive quencher can be specified such that the quencher-modified intensity function increases or decreases across the range of pH values according to a second rate of change that is greater in magnitude than the first rate of change.

Sensitivity of sensors as described herein could be increased in other ways. In some examples, the analyte-sensitive substance could include a further pH-sensitive fluorophore that is configured to fluoresce according to a further fluorescence intensity function that increases or decreases across the range of pH values. The rate of change of the further fluorescence intensity function could be opposite the rate of change of the intrinsic intensity function and/or the quencher modified intensity function across the range of pH values. The emission spectra and/or excitation spectra of the pH-sensitive fluorophore and the further pH-sensitive fluorophore could differ such that the fluorescence intensities of the pH-sensitive fluorophore and further pH-sensitive fluorophore could be detected and used to determine the local pH and/or the concentration of an analyte proximate the analyte-sensitive substance. Such a determination could include determining a difference, a ratio, or some other values based on the detected fluorescence intensities.

In some examples, a sensor as described herein could be made sensitive to changes in the concentration of an analyte (e.g., an ion) across a specified range of concentrations. This could include configuring the analyte-sensitive substance such that the specified range of concentrations corresponds to a range of pH values across which the intrinsic and/or quencher-modified intensity functions are sensitive (that is, a range of pH values across which the intensity function(s) increase or decrease). This could include specifying an amount or concentration of an ionophore or other pH-transducing substance in the analyte-sensitive substance. Additionally or alternatively, an ionic additive (e.g., an anionic or cationic additive) could be added to the analyte-sensitive substance to one of raise or lower the local pH within the analyte-sensitive substance. Such an ionic additive could be configured to raise of lower the local pH by facilitating ion-proton exchange. An amount of such an ionic additive in the analyte-sensitive substance could be specified such that the specified range of concentrations corresponds to the range of pH values to which changes in the fluorescence of the analyte-sensitive substance are greatest, or according to some other consideration.

An analyte-sensitive substance as described herein could be configured in a variety of ways. In some examples, pH-sensitive fluorophores, pH-sensitive quenchers, ionic additives, or other components of the analyte-sensitive substance could be assembled into a plurality of nanoparticles. Containing fluorophores and quenchers within nanoparticles can facilitate interaction between the fluorophores and the quenchers via Forster resonance energy transfer (FRET) effects, inner-filter effects, or other quenching processes that are facilitated by close proximity between a fluorophore and a quencher. The size, analyte-permeability, or other properties of such nanoparticles could be specified to control a rate of flux of the analyte (e.g., an ion) into and out of such nanoparticles (e.g., to and from a hydrogel of the analyte-sensitive substance in which such nanoparticles are disposed), to control an amount of quenching of the pH-sensitive fluorophore by the pH-sensitive quencher, or according to some other consideration. In some examples, the pH-sensitive fluorophore, pH-sensitive quencher, ionic additive, or other components could be composed of hydrophobic substances and could be assembled or formed into hydrophobic regions of liposomes, micelles, or other such nanoparticles. Such nanoparticles could be formed by disposing such hydrophobic substances, along with an amphiphilic substance, in an aqueous solution. The amphiphilic substance could form a mono- or bi-layer around each of the formed nanoparticles. Properties (e.g., a length of a hydrophobic chain of the amphiphilic substance) could be specified to control a rate of flux of the analyte into and out of the nanoparticles or according to some other consideration.

Analyte-sensitive substances as described herein could be incorporated into a variety of sensors and/or devices. In some examples, the analyte-sensitive substance could be disposed proximate a light emitter and/or light detector of a device. The analyte-sensitive substance could then be exposed to an environment of interest (e.g., an interstitial fluid, blood, tear fluid on a cornea of an eye, an environmental fluid, a fluid of an industrial, food processing, pharmaceutical synthesis, or other artificial environment) and the light emitter and light detector could be used to determine the concentration of an analyte in the environment of interest by detecting the fluorescence intensity of the analyte-sensitive substance. Alternatively, the analyte-sensitive substance could be disposed on or within an environment of interest (e.g., could be implanted in contact with blood or interstitial fluid beneath a skin surface) and could be optically interrogated by a light emitter and/or light detector that are located away from the analyte-sensitive substance (e.g., that are located outside of the skin surface, and that are configured to illuminate, and to receive light from, the analyte-sensitive substance via the skin surface). Further configurations and/or applications of analyte-sensitive substances, and sensors including such substances, are anticipated.

It should be understood that the above embodiments, and other embodiments described herein, are provided for explanatory purposes, and are not intended to be limiting.

II. Example Optical Detection of an Analyte

It can be beneficial in a variety of applications to detect a concentration of an analyte in an environment of interest. For example, a variety of health or medical states of a person can be related to the concentration of one or more analytes in fluids or tissues of the person. In particular, the concentration of potassium, sodium, chlorine, calcium, and a number of other ions in interstitial fluid, blood, lymph, tears, or other fluids can be related to a health or disease state of a person. In such examples, a body-mounted or otherwise configured device that is capable of detecting such ions or other analytes in a fluid or tissue of interest (e.g., by being placed against, implanted on or within, or otherwise provided in contact with the fluid or tissue) could be used to determine such health or disease states. In examples wherein such a body-mountable device is configured to be chronically mounted in/on the body, such ion or other analyte concentrations could be detected substantially continuously, or at a specified rate, to provide information about the ion concentrations in a body, or determined information about some related health or disease states, over a protracted period of time.

Detecting the concentration of an analyte in a fluid can include detecting a physical variable of one or more elements of a sensor. The sensor is configured such that the detected physical variable is related to the concentration of the analyte. For example, the sensor could include analyte-selective electrodes and the detected physical variable could be an amperometric current through the electrodes, a potentiometric voltage across the electrodes, an impedance between the electrodes (e.g., a DC impedance, or an impedance at one or more frequencies), or some other electrical property of the analyte-selective electrodes. In another example, the sensor could include an analyte-sensitive substance having an optical property (e.g., a color, an emissivity, a fluorescence intensity, an absorption spectrum, an excitation spectrum, an emission spectrum) that is related to the concentration of the analyte. The detected physical variable could be affected directly by the presence or concentration of the analyte (e.g., an ion of interest could quench a fluorescence of a fluorophore of the sensor). Additionally or alternatively, the presence of the analyte could be related to the detected physical variable indirectly. For example, an enzyme could catalyze a reaction of the analyte to produce a reaction product (e.g., hydrogen peroxide, hydrogen ions) and the detected physical variable of the sensor could be related to the presence or concentration of the reaction product.

FIG. 1 illustrates an example sensor configured to detect the concentration of an analyte (e.g., an ion) in an environment of interest 105. The environment of interest 105 could include a fluid of a body (e.g., a tear fluid, blood, lymph, interstitial fluid, saliva). Additionally or alternatively, the environment of interest 105 could include a cornea, a skin surface, a gingival surface, a tissue beneath a skin surface, or some other tissue. An analyte-sensitive substance 110 of the sensor 100 is in contact with the environment of interest 105 such that one or more optical properties of the analyte-sensitive substance are related to the concentration of the analyte in the environment of interest 105. In particular, the analyte-sensitive substance 110 includes substances configured to provide a local pH, within the analyte-sensitive substance 110, that is related to the concentration of the analyte. Further, a fluorescence intensity of a pH-sensitive fluorophore in the analyte-sensitive substance 110 is related to a local pH within the analyte-sensitive substance 110.

A light emitter 120 and light sensor 130 of the sensor 100 can be operated to detect the fluorescence intensity of the pH-sensitive fluorophore. The fluorescence intensity can be related to the concentration of the analyte in the environment of interest 105. For example, the light emitter 120 can emit illumination 125 toward the analyte-sensitive substance 110 to excite the pH-sensitive fluorophore. The pH-sensitive fluorophore can then responsively emit light 135 that can be detected by a light sensor 130 of the sensor 100. Detecting an intensity or other property of the emitted light 135 can allow the determination of the fluorescence intensity of the pH-sensitive fluorophore. A concentration of the analyte can then be determined based on the detected fluorescence intensity.

The analyte-sensitive substance 110 could be disposed proximate the light emitter 120 and/or light sensor 130 in a device. Such a device could be mounted to a human or animal body, or to some other object or environment, such that the analyte-sensitive substance 110 is in contact with the environment of interest 105. Alternatively, the analyte-sensitive substance 110 could be disposed on or within a body or other environment, and the light emitter 120 and light sensor 130 could optically interrogate (that is, illuminate and detect light emitted from) the analyte-sensitive substance remotely, e.g., through a skin surface beneath which the analyte-sensitive substance is located.

Further, while this disclosure describes detection of the concentration of an analyte via detection of the fluorescence intensity of a pH-sensitive fluorophore, other optical properties of a pH-sensitive fluorophore could additionally or alternatively be related to pH. For example, a pH-sensitive fluorophore could have a fluorescence lifetime, an emission spectrum, an excitation spectrum, or some other fluorescence properties that are affected by the pH in an environment of the fluorophore. Such alternative fluorescence properties could be detected and used, by themselves or in combination with a detected fluorescence intensity, to determine a pH and/or to determine the concentration of an analyte as described elsewhere herein in the context of the detection of fluorescence intensity.

A concentration of an analyte and/or a pH can be determined based on a detected fluorescence intensity of a fluorophore (e.g., of a fluorophore in an analyte-sensitive substance) and some information about the relationship between the fluorescence of the fluorophore and the pH and/or concentration of the analyte. Such a relationship could be determined based on known properties of the fluorophore. Additionally or alternatively, a calibration curve or other information about the relationship could be determined experimentally (e.g., by exposing the fluorophore to a variety of different environments having respective values of pH and/or analyte concentration and detecting the fluorescence intensity of the fluorophore when exposed to each of the different environments).

Figure 2:
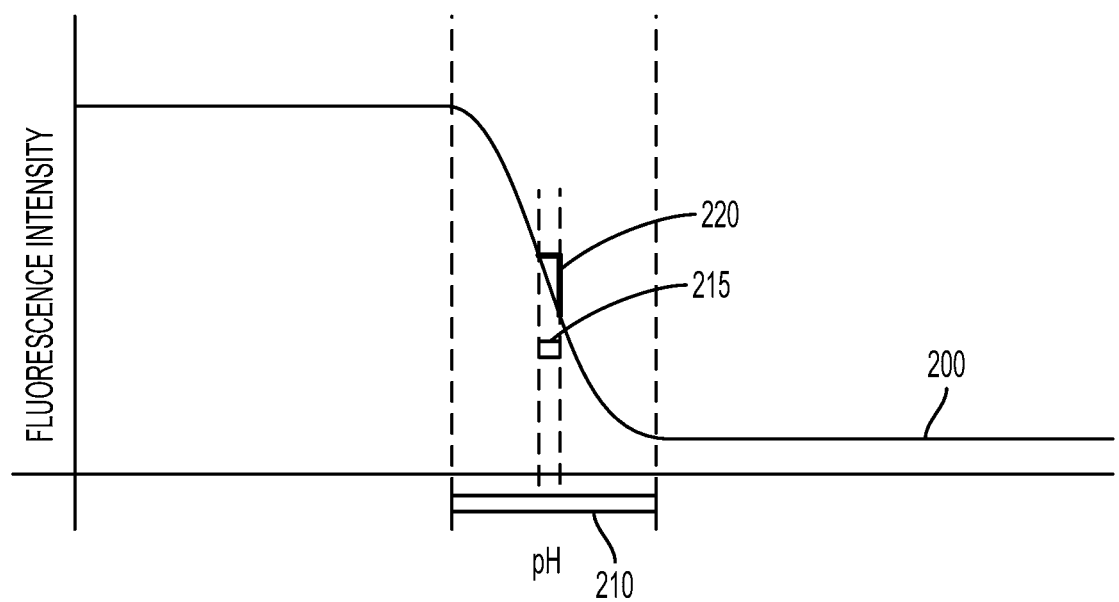
FIG. 2 is an example plot of the fluorescence intensity of a pH-sensitive fluorophore.

The relationship between the fluorescence intensity of a fluorophore and pH (or some other variable of interest) in the environment of the fluorophore called be referred to as an intensity function. Such an intensity function could take a variety of forms. FIG. 2 illustrates an example fluorescence intensity function 200 of a fluorophore as a function of the pH in the environment of the fluorophore (e.g., as a function of a local pH within an analyte-sensitive substance that includes the fluorophore). As illustrated in FIG. 2, the fluorescence intensity function decreases as a function of the pH. Specifically, the fluorophore exhibits a high level of fluorescence intensity at low values of pH. Conversely, the fluorophore exhibits a low level of fluorescence intensity at high values of pH. The fluorescence intensity of the pH-sensitive fluorophore gradually decreases from the high level to the low level as the pH increases across an indicated sensitive range 210 of pH values. As illustrated, this decrease could be nonlinear with changes in the pH level, though the change may be substantially linear within short ranges of change in pH within the sensitive range 210. For example, the example fluorescence intensity function 200 decreases at a first rate of change 220 across a particular range of pH values 215 within the sensitive range 210.

Note that the illustrated fluorescence intensity function 200 is intended as a non-limiting example of the dependence of the fluorescence intensity of a pH-sensitive fluorophore, or of a complex of molecules that includes a pH-sensitive fluorophore, on pH. The fluorescence intensity function of a pH-sensitive fluorophore could have other shapes, could be non-monotonic (that is, could decrease with pH over some ranges of pH and increase over other ranges), could be low at low values of pH and/or high at high values of pH, or could have some other properties. The pH-sensitive fluorophore could include a variety of substances configured to change pH intensity according to a local pH value by a variety of different mechanisms. For example, the concentration of hydrogen ions could act to protonate and/or deprotonate the pH-sensitive fluorophore and affect a molecular orbital of the pH-sensitive fluorophore, to change a conformation of the fluorophore such that the fluorophore changes an excitation or emission spectrum, or could affect the pH-sensitive fluorophore in some other way such that the pH-sensitive fluorophore has an intrinsic fluorescence intensity function (e.g., 200) that varies with changes in the pH of the environment of the pH-sensitive fluorophore.

A pH-sensitive fluorophore could include a variety of different compounds, chemicals, or other structures. In examples wherein the pH-sensitive fluorophore has a fluorescence intensity that decreases with pH (as with the example intensity function 210), the pH-sensitive fluorophore could include pH-sensitive boron-dipyrromethene dyes, derivatives of nile red, squaraine, squaraine rotaxane, or some other substance(s) having a fluorescence intensity that decreases with increases in pH over one or more ranges of pH values. In examples wherein the pH-sensitive fluorophore has a fluorescence intensity that increases with pH, the pH-sensitive fluorophore could include fluorescein, a fluorescein derivative, or some other substance(s) having a fluorescence intensity that increases with increases in pH over one or more ranges of pH values.

The change in the fluorescence intensity function 200 across the sensitive range of pH values 210 could allow the pH in the environment of the fluorophore to be detected optically. That is, the fluorescence intensity of the fluorophore could be optically detected (e.g., by illuminating the fluorophore with light having a specified intensity and/or wavelength and detecting the intensity or other property or responsively emitted fluorescent light from the fluorophore) and used to determine the pH, based on knowledge of the fluorescence intensity function 200. The sensitivity of such a detection (e.g., a minimum detectable change in the pH) could be related to the rate of change of the fluorescence intensity function 200 (that is, the slope of the function 200) with respect to changes in pH. That is, the greater the magnitude of the slope, the more the fluorescence intensity changes with pH, and thus the greater the sensitivity of optical detection of the pH using the fluorophore.

As noted above, a pH-sensitive fluorophore can be used to optically detect pH in an environment of the pH-sensitive fluorophore. Other physical variables that are related to the detected pH (e.g., the concentration of an acid) could be detected based on such a detected pH and/or detected fluorescence intensity. Thus, the pH-sensitive fluorophore could be used to detect the concentration of an analyte of interest by making the pH in the environment of the pH-sensitive fluorophore be affected by the pH in the environment. This could include adding a pH-transducing agent that is configured to provide a local pH that is related to the concentration of the analyte. Such a pH-transducing agent could be configured to selectively bind to or otherwise selectively interact with (e.g., catalyze a reaction of) the analyte to provide the local pH.

In some examples, the transducer agent could be an ionophore, and the analyte could be an ion that the ionophore is configured to bind. Binding of the ion by the ionophore could cause a change in the local concentration of hydrogen (e.g., by the hydrogen being attracted or repelled by the charged ion bound to the ionophore), thus changing the local pH. The ion could be sodium, calcium, chlorine, potassium, a charged protein, or some other ion of interest. Accordingly, the transducer agent could include a crown ether, a calixarene, a cryptand, or some other substance configured to selectively bind to one or more ions of interest.

As noted above, the sensitivity of optical detection of pH (or of detection of an analyte of interest whose concentration affects a local pH) can be related to the rate of change of the fluorescence intensity of a pH-sensitive fluorophore with changes in the pH. To increase the sensitivity of the optical detection of the pH (or the optical detection of an analyte whose concentration is related to the pH), the rate of change of the fluorescence intensity of the pH-sensitive fluorophore with changes in pH could be increased within a range of pH values of interest. Additionally or alternatively, the local pH of the pH-sensitive fluorophore could be shifted (e.g., by adding an ionic additive) such that a range of local pH values across which the pH-sensitive fluorophore is sensitive (e.g., the sensitive range 210) corresponds to a range of pH values of interest, or to a corresponding range of concentration values of an analyte of interest.

To increase the slope of the fluorescence intensity function of a pH-sensitive fluorophore (that is, to increase the slope above some level that is intrinsic to the pH-sensitive fluorophore), a pH-sensitive quenching agent could be added to the fluorophore. Such a pH-sensitive quencher could act to reduce the fluorescence intensity of the pH-sensitive fluorophore (i.e., to quench the pH-sensitive fluorophore) in a manner that is dependent on the local pH in the environment of the pH-sensitive quencher and pH-sensitive fluorophore. Thus, properties of the pH-sensitive quencher (e.g., a dependence on the local pH of the degree to which the pH-sensitive quencher quenches the pH-sensitive fluorophore) could be matched to the pH-sensitive fluorophore such that a quencher-modified fluorescence intensity function of the pH-sensitive fluorophore has a greater slope within a range of pH values of interest (e.g., a range of pH values that correspond to a range of concentrations of an analyte) than the fluorophore's intrinsic intensity function.

As noted above, a pH-sensitive quencher could be added to a pH-sensitive fluorophore (such that the pH-sensitive quencher acts to quench the pH-sensitive fluorophore) to increase the sensitivity of the pH-sensitive fluorophore to changes in pH. This could include adding a pH-sensitive quencher that decreases its quenching with increasing pH to a pH-sensitive fluorophore that increases its fluorescence intensity with increasing pH. In such an example, a quencher-modified fluorescence intensity of the pH-sensitive fluorophore could increase with pH across a specified range of pH values at a rate of change that is greater than the rate of change of the intrinsic fluorescence intensity of the pH-sensitive fluorophore across the specified range of pH values. Alternatively, a pH-sensitive quencher that increases its quenching with increasing pH could be added to a pH-sensitive fluorophore that decreases its fluorescence intensity with increasing pH. In such an example, a quencher-modified fluorescence intensity of the pH-sensitive fluorophore could decrease with pH across a specified range of pH values at a rate of change that is greater than the rate of change of the intrinsic fluorescence intensity of the pH-sensitive fluorophore across the specified range of pH values.

Figure 3A:
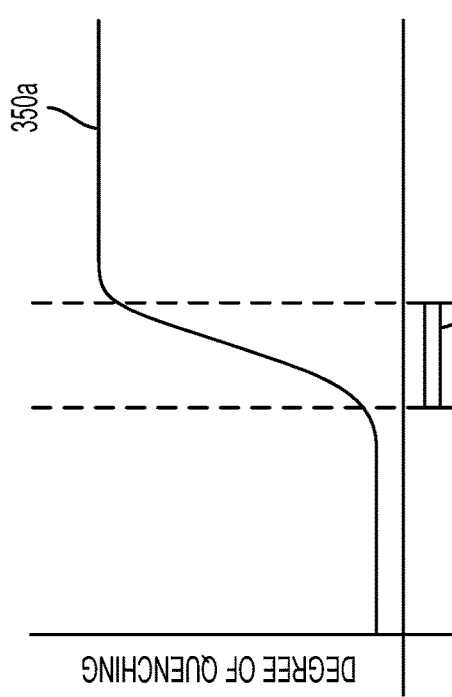
FIG. 3A is an example plot of the quenching activity of a pH-sensitive quencher.
Figure 3B:
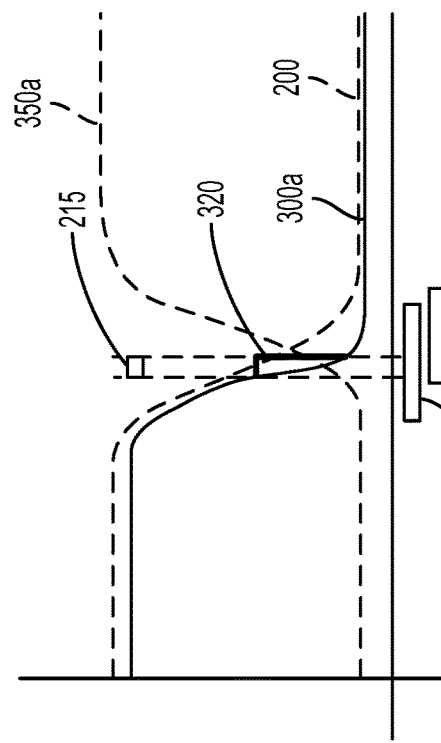
FIG. 3B is an examples plot of a quencher-modified intensity function of the pH-sensitive fluorophore of FIG. 2 when being quenched by the pH-sensitive quencher of FIG. 3A.

The use of a pH-sensitive quencher to increase the sensitivity of a pH-sensitive fluorophore is illustrated by way of example in FIGS. 3A and 3B. FIG. 3A illustrates an example degree of quenching function 350a of a pH-sensitive quencher as a function of the pH in the environment of the quencher (e.g., as a function of a local pH within an analyte-sensitive substance that includes the quencher and a pH-sensitive fluorophore that is being quenched by the pH-sensitive quencher). As illustrated in FIG. 3A, the quenching function 350a increases as a function of the pH. Specifically, the pH-sensitive quencher minimally quenches (e.g., effectively does not quench) the pH-sensitive fluorophore at low values of pH. Conversely, the pH-sensitive quencher maximally quenches the fluorophore at high values of pH. The degree of quenching of the pH-sensitive quencher gradually increases from the low level to the high level as the pH increases across an indicated sensitive range 355a of pH values.

A pH-sensitive quencher having such a pH-dependent quenching function 350a could be added to a pH-sensitive fluorophore that decreases its fluorescence intensity with increasing pH (e.g., as shown in FIG. 2) such that a quencher-modified fluorescence intensity of the pH-sensitive fluorophore decreases with increasing pH at a greater rate, across a range of pH values of interest, than an intrinsic intensity function of the pH-sensitive fluorophore. This is illustrated by way of example in FIG. 3B. FIG. 3B shows the fluorescence intensity function 200 of FIG. 2B overlaid on the quenching function 350a of FIG. 3A, along with those functions' respective sensitive ranges 210, 355a, which partially overlap. FIG. 3B also shows, overlaid on the other functions 200, 350a, a quencher-modified fluorescence intensity function 300a of the pH-sensitive fluorophore when in the presence of the pH-sensitive quencher. The quencher-modified fluorescence intensity function 300a decreases at a second rate of change 320 across the particular range of pH values 215 that is also indicated in FIG. 2.

As shown in FIG. 3B, the second rate of change 320 of the quencher-modified fluorescence intensity function 300a shown in FIG. 3B is greater in magnitude than the first rate of change 220 of the intrinsic fluorescence intensity function 200 of the pH-sensitive fluorophore shown in FIG. 2. This can be related to the increasing activity of the pH-sensitive quencher to quench the pH-sensitive fluorophore across the particular range of pH values 215. As a result, the sensitivity of a sensor that includes the pH-sensitive fluorophore and pH-sensitive quencher to pH values within the particular range of pH values 215 could be greater than a sensor that omits the pH-sensitive quencher.

Note that the illustrated degree of quenching function 350a and quencher-modified fluorescence intensity function 320 are intended as non-limiting examples. For instance, the quenching function of a pH-sensitive quencher could have other shapes, could be non-monotonic (that is, could decrease with pH over some ranges of pH and increase over other ranges), could be low at low values of pH and/or high at high values of pH, or could have some other properties. Further, the quenching activity of a pH-sensitive quencher could be dependent of the wavelength at which the pH-sensitive quencher is quenching; for example, a pH-sensitive quencher could increase, with increasing pH, its degree of quenching at a first wavelength while decreasing its degree of quenching at a second wavelength.

Note that the principles described herein could also be applied to increase the sensitivity of a pH-sensitive fluorophore that increases its fluorescence intensity with increasing pH by adding, e.g., a pH-sensitive quencher that decreases a degree of quenching of the pH-sensitive fluorophore with increasing pH. Further, multiple pH-sensitive quenchers, having respective difference pH-dependent quenching functions, could be added to a single pH-sensitive fluorophore to, e.g., increase the magnitude of the rate of change of the fluorescence intensity of the pH-sensitive fluorophore across multiple respective ranges of pH values.

A pH-sensitive quencher could include a variety of different compounds, chemicals, or other structures. The pH-sensitive quencher could include a spiropyran, a derivative of nile red dye, coumarin, a derivative of coumarin, alizarin, a derivative of alizarin, or some other substance that can quench the fluorescence of a fluorophore in a pH-dependent manner. In some examples, the pH-sensitive quencher could be a blueberry-derived ester (e.g., one of the BLU series pH sensitive quenchers available from Berry and Associates) or a blackberry-derived phosphoramidite (e.g., one of the BBQ series pH sensitive quenchers available from Berry and Associates).

The pH-sensitive quencher could be a dark quencher (e.g., could act to quench a fluorophore by absorbing energy from the excited fluorophore and dissipating the absorbed energy as heat), could dissipate energy received from an excited fluorophore as an emitted fluorescent photon, or could quench a fluorophore by some other mechanism. The pH-sensitive quencher could act to quench a fluorophore by absorbing energy within a range of wavelengths; in such examples, the range of absorbance wavelengths of the pH-sensitive quencher could be matched to an excitation and/or emission spectrum of a pH-sensitive fluorophore. Further, the pH-sensitive quencher could be selected such that a range over which the quencher increases or decreases its degree of quenching (e.g., 355a) is matched to (e.g., partially overlapping with) a range over which the pH-sensitive fluorophore increases or decreases its fluorescence intensity (e.g., 210).

As noted above, a pH-sensitive fluorophore and/or a combination of a pH-sensitive fluorophore and a pH-sensitive quencher could have a pH-dependent fluorescence intensity that is highly sensitive to changes in pH across a specific range of pH values (e.g., 210, 215). An analyte-sensitive substance could include such substances in addition to a pH-transducing substance (e.g., an ionophore) that is configured to provide a local pH within the analyte-sensitive substance that is related to the concentration of an analyte proximate the analyte-sensitive substance. Such an analyte-sensitive substance could then be optically interrogated (e.g., as described by example in combination with FIG. 1) to detect the concentration of the analyte proximate the analyte-sensitive substance (e.g., a concentration within a tissue, a bodily fluid, or some other environment of interest proximate to the analyte-sensitive substance).

The analyte-sensitive substance could be configured to be sensitive to the concentration of an analyte over a range of concentrations of interest (e.g., a range of physiologically relevant concentrations of the analyte). This could be achieved by controlling properties of the pH-transducing substance (e.g., an amount or concentration of an ionophore) such that the range of concentrations of interest correspond to a range of local pH values over which the fluorescence intensity of the pH-sensitive fluorophore and/or pH-sensitive quencher is increasing or decreasing (e.g., 215). Additionally or alternatively, an amount of an ionic additive could be added to the analyte-sensitive substance to shift the local pH within the analyte-sensitive substance such that the range of concentrations of interest corresponds to a range of local pH values over which the fluorescence intensity of the pH-sensitive fluorophore and/or pH-sensitive quencher is increasing or decreasing (e.g., 215).

Such ionic additives could include anionic or cationic substances. Such substances could include weakly interacting and/or non-coordinating anions or cations. Such ionic additives could affect a local pH by having a charge that attracts or repels hydrogen ions, by facilitating ion-proton exchange, and/or via some other processes, thus changing a local pH by an amount related to the amount of the charge, the amount or concentration of the ionic additive, or other factors. Such ionic additives could include tetrakis[3,5-bis (trifluoromethyl)phenyl]boron sodium, tetrakis(pentafluorophenyl)boron lithium ethyl etherate, tetra(p-tolyl)boron sodium, tetra(p-tolyl)boron sodium, tetrakis(4-tert-butylphenyl) boron potassium, tetraphenylboron lithium tris (1,2-dimethoxyethane), tetrakis(4-chlorophenyl) boron potassium, or tridodecylammonium chloride.

Figure 4A:
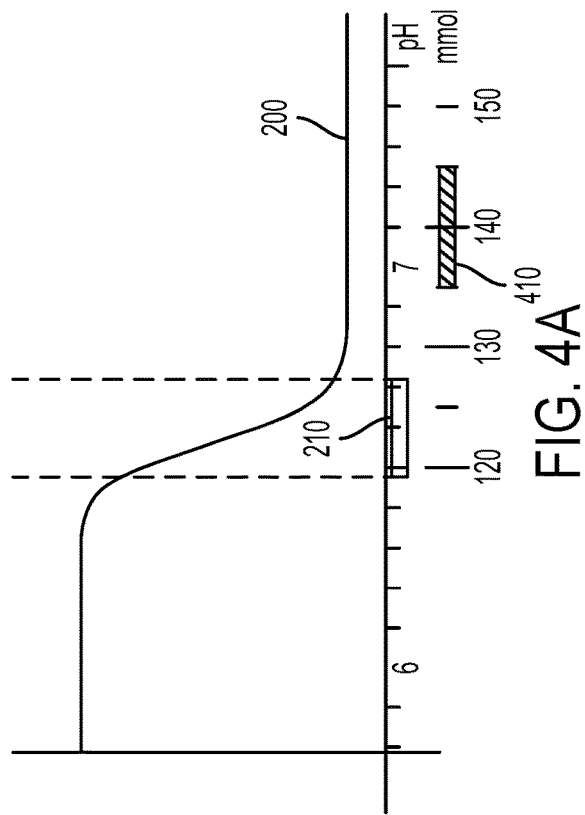
FIG. 4A is an example plot of the fluorescence intensity of the pH-sensitive fluorophore of FIG. 2 and the correspondence of pH to the concentration of an analyte.

To illustrate the use of an ionic additive to shift the local pH within an analyte-sensitive substance and/or to increase the sensitivity of such an analyte-sensitive substance to concentrations of an analyte within a range of concentrations of interest, FIG. 4A illustrates the example fluorescence intensity function 200 of a fluorophore as a function of the pH within an analyte-sensitive substance. The relationship between the fluorescence intensity function 200 and the local pH within the analyte-sensitive substance is indicated by the pH values on the horizontal axis of FIG. 4A. The analyte-sensitive substance additionally includes a pH-transducing substance (e.g., an ionophore) that provides the local pH according to the concentration of an analyte (e.g., an ion) in an environment of interest to which the analyte-sensitive substance is exposed. The relationship between the local pH and the concentration of the analyte is indicated by the correspondence between the pH values and the concentration values on the horizontal axis of FIG. 4A. A specified range of concentrations of interest 410 of the analyte is also indicated.

Figure 4B:
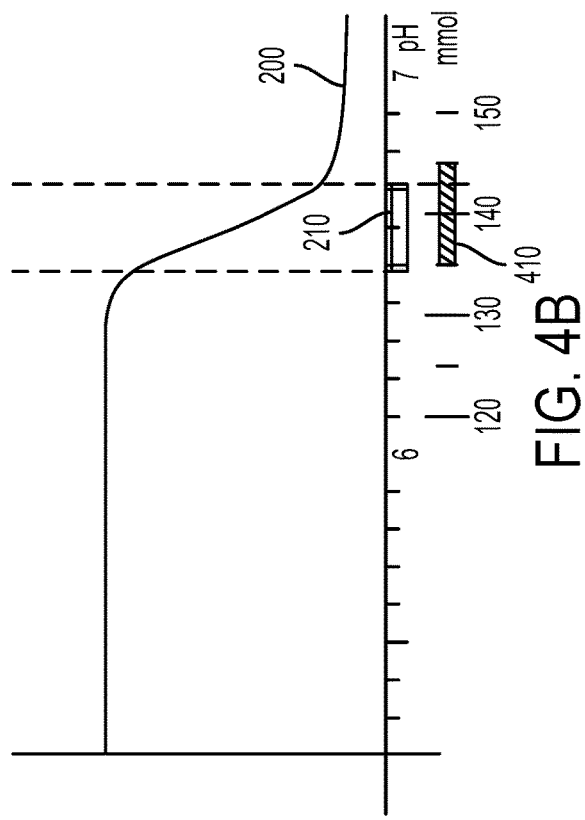
FIG. 4B is an example plot of the fluorescence intensity of the pH-sensitive fluorophore of FIG. 2 and the correspondence of pH to the concentration of an analyte when the pH-sensitive fluorophore is combined with an ionic additive.

As shown in FIG. 4A, the range of concentrations of interest 410 corresponds to a range of local pH values over which the analyte-sensitive substance is not sensitive, that is, a range of local pH values over which the fluorescence intensity function 200 does not significantly change. In order to use the analyte-sensitive substance to detect concentrations of the analyte within the range of concentrations of interest 410, an amount of an ionic additive could be added to the analyte-sensitive substance to shift the local pH within the analyte-sensitive substance such that the range of concentrations of interest 410 corresponds to a range of local pH values over which the fluorescence intensity 200 is increasing or decreasing (e.g., the indicated range of pH values 210). This is illustrated in FIG. 4B, wherein the local pH has been shifted downward by approximately 4.5. As a result, the relationship between the local pH and the concentration of the analyte (as indicated on the horizontal axis of FIG. 4B) is shifted such that the range of concentrations of interest 410 corresponds to the range of local pH values over which the fluorescence intensity is decreasing 210.

FIGS. 4C and 4D illustrate the use of two different ionic additives, tridodecylammonium chloride (TDMACl) and tetrakis[3,5-bis(trifluoromethyl)phenyl]boron sodium (NaBARF), to shift the local pH within an analyte-sensitive substance and thus to control the correspondence between the fluorescence intensity of a pH-sensitive fluorophore (or a combination of a pH-sensitive fluorophore and a pH-sensitive quencher) and the concentration of an analyte in an environment of interest to which the analyte-sensitive substance is exposed.

The type of the ionic additive (i.e., anionic or cationic) affects the direction in which the local pH is shifted. FIG. 4C shows the normalized fluorescence intensity of an analyte-sensitive substance as a function of the pH in an environment to which the analyte-sensitive substance is exposed. The normalized fluorescence intensity of the analyte-sensitive substance without any ionic additives is indicated by the squares. Addition of a cationic ionic additive (in this example, TDMACl) shifts the normalized fluorescence intensity, as a function of external pH, to the left (indicated by the diamonds). Addition of an anionic ionic additive (in this example, NaBARF) shifts the normalized fluorescence intensity, as a function of external pH, to the right (indicated by the circles).

An amount of an ionic additive added to an analyte-sensitive substance can affect the amount by which the local pH is shifted. FIG. 4D shows the normalized fluorescence intensity of an analyte-sensitive substance as a function of the pH in an environment to which the analyte-sensitive substance is exposed. The normalized fluorescence intensity of the analyte-sensitive substance with the addition of a baseline amount of TDMACl ("1×") is indicated by the squares. Increasing the amount of the TDMACl by 50% ("1.5×") shifts the normalized fluorescence intensity to lower pH values (i.e., to the left), as indicated by the diamonds. Further increasing the amount of the TDMACl, to twice the baseline amount ("2×"), further shifts the normalized fluorescence intensity to the left (i.e., to lower pH values), as indicated by the circles.

An analyte-sensitive substance as described herein could include multiple fluorophores that are sensitive to (i.e., that have fluorescence intensities that increase or decrease with increasing pH values) respective different ranges of pH values (and thus to respective different corresponding ranges of concentrations of an analyte). Additionally or alternatively, an analyte-sensitive substance could include a first pH-sensitive fluorophore that increases in fluorescence intensity across a range of pH values and a second pH-sensitive fluorophore that decreases in fluorescence intensity across the range of pH values. Detecting the fluorescence intensities of the first and second pH-sensitive fluorophores could allow the pH within the analyte-sensitive substance and/or the concentration of an analyte to be determined with higher precision and/or accuracy, e.g., according to a difference or ratio of the detected fluorescence intensities. This could include using the detected fluorescence intensity of one or both of the pH-sensitive fluorophores to account for an amount of background fluorescence of the analyte-sensitive substance, to account for a temperature-dependence of the fluorescence of one or both of the pH-sensitive fluorophores, or to determine a local pH and/or concentration of an analyte according to some other method.

FIG. 5 illustrates a first example fluorescence intensity function 200 of a first pH-sensitive fluorophore as a function of a local pH within an analyte-sensitive substance. As illustrated in FIG. 5, the first fluorescence intensity function 200 decreases as a function of the local pH. FIG. 5 also illustrates, superimposed on the first example fluorescence intensity function 200, a second example fluorescence intensity function 500 of a second pH-sensitive fluorophore which decreases as a function of the local pH. The fluorescence intensity of the first pH-sensitive fluorophore gradually decreases as the pH increases across an indicated first sensitive range 210 of pH values, the fluorescence intensity of the second pH-sensitive fluorophore gradually increases as the pH increases across an indicated second sensitive range 510 of pH values, and the first and second range at least partially overlap.

As a result, the local pH (or an analyte concentration that is related to the local pH) can be determined based on the detected fluorescence intensities of the first and second fluorophores. The first and second fluorophores can differ with respect to an emission spectrum, an excitation spectrum, a fluorescence lifetime, and/or some other optical properties such that the fluorescence intensities of the first and second fluorophores can be independently detected (e.g., by emitting respective first and second lights at respective different first and second excitation wavelengths of the first and second fluorophores and/or by detecting light emitted from the first and second fluorophores at respective different first and second emission wavelengths). The first and second fluorophores could be selected such that they respectively increase and decrease in fluorescence intensity over a common range of pH values. Additionally or alternatively, an ionic additive could be added to shift the local pH experienced by one or both of the fluorophores. This could include localizing an ionic additive proximate to one of the fluorophores but not the other, e.g., by forming the a first fluorophore and an optional first ionic additive into a first plurality of nanoparticles of the analyte-sensitive substance and by forming the second fluorophore and an optional second ionic additive into a second plurality of nanoparticles of the analyte-sensitive substance.

III. Example Analyte-Sensitive Substances

As noted above, a variety of pH-sensitive fluorophores, pH-sensitive quenchers, pH-transducing agents (e.g., ionophores), ionic additives, or other substances can be formed into an analyte-sensitive substance such that a pH, or the concentration of an analyte, can be detected by optically interrogating (e.g., illuminating and detecting light responsively emitted from) the analyte-sensitive substance. Such substances could be disposed within an analyte-permeable material (e.g., a hydrogel) to form an analyte-sensitive substance and the analyte-sensitive substance could be disposed on a surface, formed into a solid, implanted into a tissue, or configured in some other way to allow the concentration of an analyte in an environment of interest to be detected.

The effectiveness of a pH-sensitive quencher in quenching a fluorophore (e.g., a pH-sensitive fluorophore) could be related to the proximity between the quencher and the fluorophore. Similarly, the effectiveness of an ionic additive or an ionophore in controlling a local pH of a pH-sensitive fluorophore and/or a pH-sensitive quencher could be related to the proximity between the ionic additive or ionophore and the quencher and/or fluorophore. Thus, an analyte-sensitive substance could be formed such that such elements of the substance are proximate each other. For instance, such substances could be collocated within a plurality of nanoparticles. A pH-sensitive fluorophore, a pH-sensitive quencher, an ionic additive, an ionophore, or some other elements of the analyte-sensitive substance could be disposed within the cores or other specified regions (e.g., within a bilayer of a liposome) of such nanoparticles such that the distance between the various elements is less than, at most, the diameter or some other dimension (e.g., a thickness of a liposomal wall) of the nanoparticles. Containing fluorophores and quenchers within nanoparticles can facilitate interaction between the fluorophores and the quenchers via Forster resonance energy transfer (FRET) effects, inner-filter effects, or other quenching processes that are facilitated by close proximity between a fluorophore and a quencher. Such nanoparticles could then be disposed on a surface (e.g., a surface of a sensor probe, within an analyte-permeable polymer layer disposed on such a surface), distributed throughout a volume (e.g., a volume of an analyte-permeable polymer), or disposed in some other way such that the nanoparticles are exposed to an analyte and/or a pH of an environment of interest and such that the fluorophores of the substance can be optically interrogated.

Figure 6:
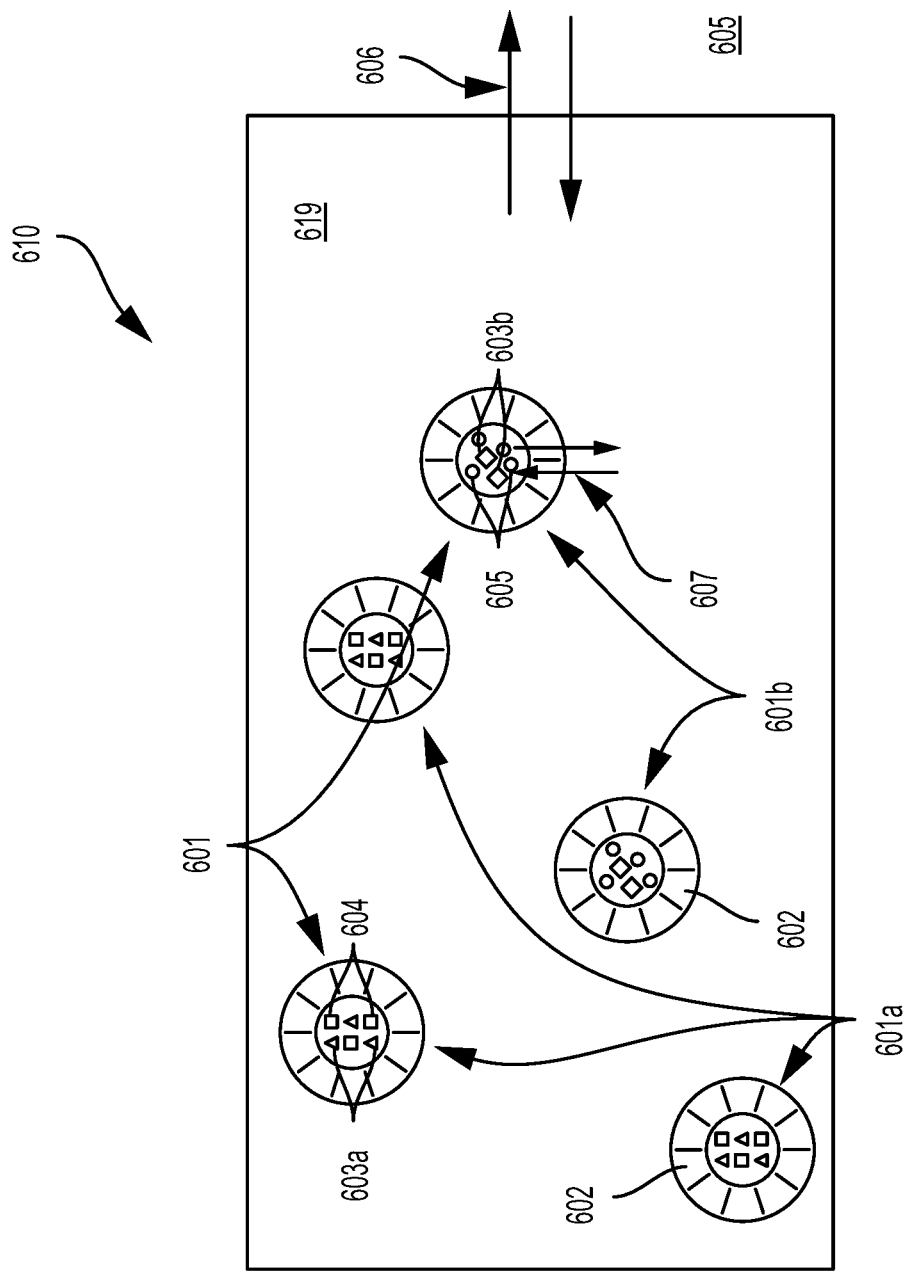
FIG. 6 is a schematic view of an example analyte sensor that includes an analyte-sensitive substance, showing a simplified schematic view of nanoparticles of the analyte-sensitive substance.
Figure 6:
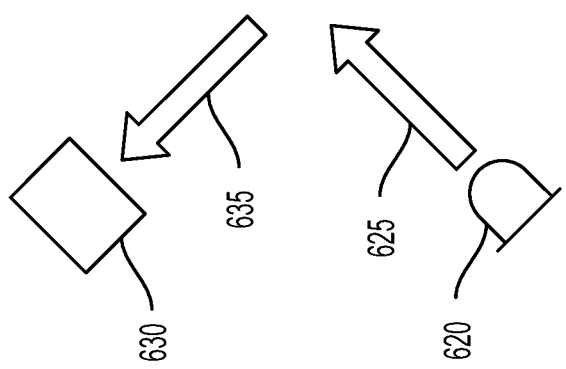

FIG. 6 illustrates an example analyte-sensitive substance 610 that includes a plurality of nanoparticles 601 within which first 603a and second 603b pH-sensitive fluorophores, pH-sensitive quenchers 604, and ionic additives 605 are disposed. The nanoparticles are disposed in an analyte-permeable substance 619. The analyte can flow between an environment of interest 605 and the analyte-sensitive substance 610 (indicated by the large arrows 606) and between the analyte-permeable substance 619 and the cores of the nanoparticles 601 (indicated by the large arrows 607). A light emitter 620 emits illumination 625 to excite the fluorophores 603a, 603b and a light sensor 630 detects an intensity, wavelength, or other properties of responsively emitted light 635 from the fluorophores 603a, 603b.

Note that the nanoparticles 601 include first 601a and second 601b types of nanoparticles. This could allow different elements of the analyte-sensitive substance 601 to be physically proximate to certain elements of the analyte-sensitive substance 601 but not to other elements of the analyte-sensitive substance 601. For example, the pH-sensitive quencher 604 could be disposed only within the first nanoparticles 601a such that the quencher 604 quenches the first pH-sensitive fluorophore 603a but not the second pH-sensitive fluorophore 603b. In another example, the ionic additive 605 could be disposed only within the second nanoparticles 601b such that the ionic additive 605 alters the local pH of the second pH-sensitive fluorophore 603b but not the local pH of the first pH-sensitive fluorophore 603a.

In some examples, the first 603a and second 603b fluorophores could differ with respect to an excitation spectrum, an emission spectrum, or some other property such that the fluorescence intensities of the first 603a and second 603b fluorophores could be independently detected. In such examples, the first 601a and second 601b nanoparticles could include the same ionophore (or other analyte-selective pH-transducing agent) to enable the detection (e.g., ratiometrically) of the same ion (or other analyte), or the first 601a and second 601b nanoparticles could include different ionophores to allow for detection of different ions.

Note that the illustrated configuration of elements of an analyte-sensitive substance is intended as a non-limiting example. An analyte-sensitive substance could include more or fewer types of nanoparticles, and such nanoparticles could be configured differently than the example nanoparticles illustrated in FIG. 6. For instance, the nanoparticles could be liposomes, and the fluorophores, quenchers, ionophores, and/or other elements of the analyte-sensitive substance could be disposed within the walls of the liposomes.

Nanoparticles of an analyte-sensitive substance as described herein (e.g., 601) could be formed in a variety of ways. In some examples, a nonpolar solution (e.g., a solution that includes an organic solvent like tetrahydrofuran and/or dichloromethane) containing elements of the nanoparticles (e.g., a pH-sensitive fluorophore, a pH-sensitive quencher, an ionophore, an ionic additive, or some other element(s)) could be created. In such examples, the elements are themselves composed of hydrophobic or amphiphilic materials or compounds. The solution could then be added to an aqueous solution such that the hydrophobic elements in the nonpolar solution form into nanoparticles. The nonpolar solution could then be removed (e.g., by evaporation. The formed nanoparticles could then be disposed on a surface, disposed within an analyte-permeable substance (e.g., a polymer, a hydrogel).

In some examples, such formation into nanoparticles could be facilitated by the presence of an amphiphilic compound in the nonpolar solution and/or in the aqueous solution. Nanoparticles formed in such a way could include a layer of such an amphiphilic compound (illustrated as layers 602 in FIG. 6) that contains a core of hydrophobic substances (e.g., one or more pH-sensitive fluorophores, pH-sensitive quenchers, ionic additives, ionophores, and/or other substances). The nanoparticles could include one or more of a variety of amphiphilic compounds, e.g., an amphiphilic block copolymer, a detergent, a surfactant, DSPE-PEG Pluronic, PLA-PEG, polyethylene glycol sorbitan monooleate, Surfactol, D-a-tocopherol polyethylene glycol succinate, or some other amphiphilic substance(s). Further, properties of the amphiphilic compound could be specified to control properties of the nanoparticles, e.g., a diameter of the nanoparticles, a thickness of a formed layer 602 of the amphiphilic compound of the nanoparticles, a rate or degree of flux of an analyte through the layer 602 of the amphiphilic compound, or some other properties. For example, a length of a nonpolar aspect of the amphiphilic compound (e.g., a length of a PEG chain of the compound) could be specified to control a thickness of the formed layer of the amphiphilic compound.

The nanoparticles could be formed from a mixture of nonpolar and aqueous solutions as described above in a variety of ways. In some examples, the amphiphilic compound could be disposed in the aqueous solution and the aqueous solution could be sonicated (e.g., exposed to ultrasonic acoustical energy) while the nonpolar solution including the pH-sensitive fluorophore, pH-sensitive quencher, ionic additive, and/or ionophore is added to the aqueous solution. In a particular example, the nonpolar solution comprises an organic solvent of tetrahydrofuran (THF) and dichloromethane (DCM) in a ratio between approximately 1:1 to approximately 1:50 THF:DCM. The aqueous solution includes less than approximately 1% weight/volume of the amphiphilic compound and is sonicated while the nonpolar solution is injected into the aqueous solution. The aqueous solution is sonicated via probe-tip sonication, horn sonication, or bath sonication for between approximately 1 minute and approximately 5 minutes. After sonication, the organic solvent can be evaporated by applying a vacuum to the solution and/or by blowing dry air or nitrogen past the solution. Additionally or alternatively, the amphiphilic compound could be present in the nonpolar solvent solution before the nonpolar solvent is added to the aqueous solution.

The nanoparticles could also be formed by using an organic solvent that is miscible in water to form the nonpolar solution that contains the pH-sensitive fluorophore, pH-sensitive quencher, ionic additive, ionophore, or other hydrophobic elements of the nanoparticles. The organic solvent could further have a lower boiling point than water and/or be more volatile than water in order to allow for evaporation of the organic solvent. For example, the organic solvent could include THF. In a particular example, THF or some other organic solvent could be added to an aqueous solution in a volume ratio of between approximately 1:20 and approximately 1:4 THF:water. The nonpolar solution containing the organic solvent, the hydrophobic elements of the nanoparticles, and/or the amphiphilic compound could be injected into the aqueous solution and the mixture could be vigorously stirred for between approximately 10 seconds and approximately 10 minutes. The organic solvent could then be evaporated by applying a vacuum to the solution and/or by blowing dry air or nitrogen past the solution.

IV. Example Methods

Figure 7:
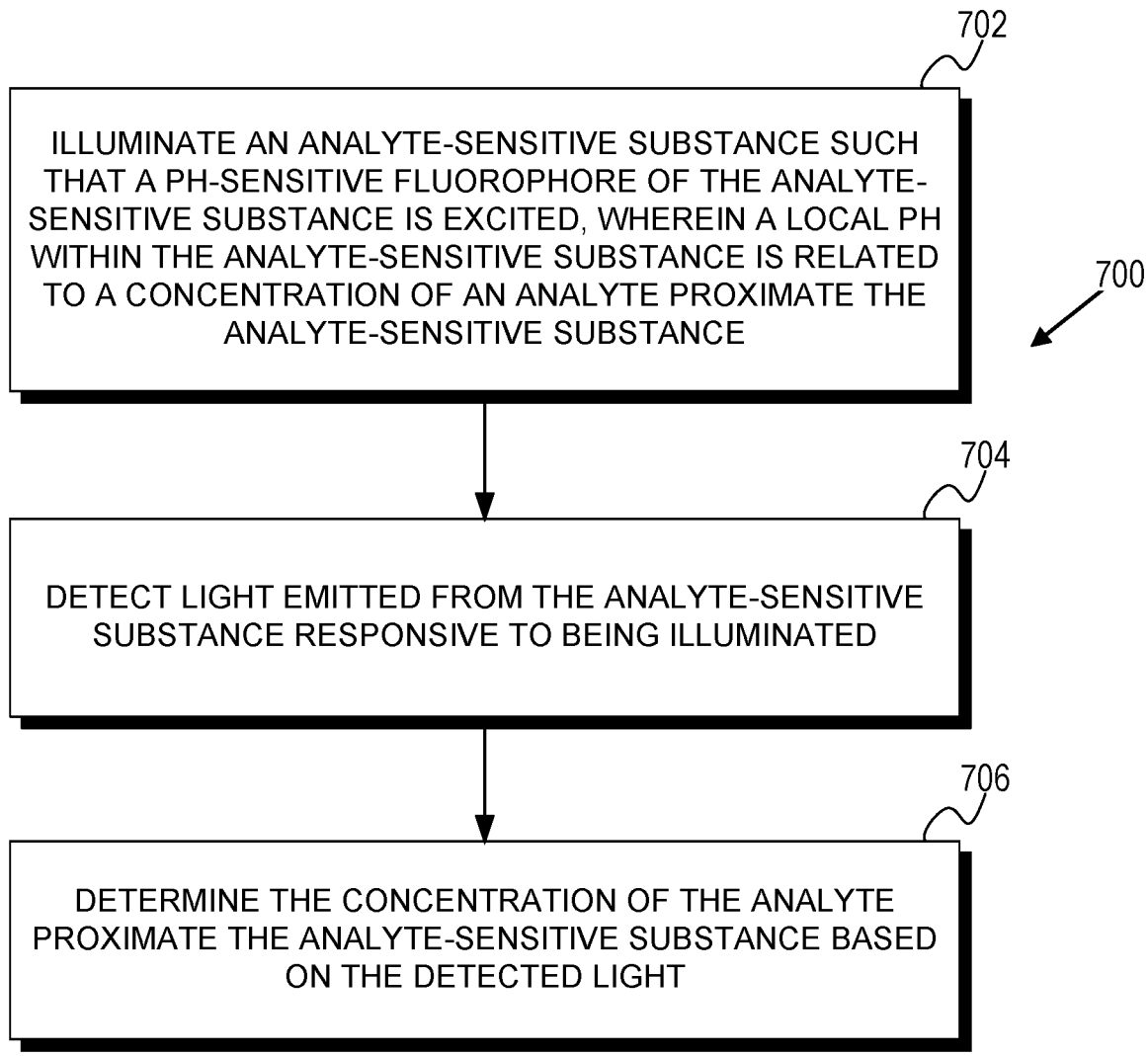
FIG. 7 is a flowchart of an example method.

FIG. 7 is a flowchart of a method 700 for measuring an analyte concentration in an environment of interest using an analyte-sensitive substance, e.g., to detect the concentration of an ion in a tissue or a fluid of a body. The analyte-sensitive substance includes a pH-sensitive fluorophore and an analyte-selective pH-transducing agent (e.g., an ionophore). The pH-transducing agent is configured to provide a local pH within the analyte-sensitive substance that is related to the concentration of the analyte proximate the analyte-sensitive substance (e.g., to the concentration of an analyte in a tissue or fluid of a body). The pH-sensitive fluorophore has a fluorescence intensity that increases or decreases with changes in the local pH. The analyte-sensitive substance could further include one or more of a pH-sensitive quencher, an ionic additive, or some other elements as described elsewhere herein.

The method 700 includes illuminating, the analyte-sensitive substance such that the pH-sensitive fluorophore of the analyte-sensitive substance is excited (702). This could include illuminating the analyte-sensitive substance with light at one or more specified wavelengths, e.g., an excitation wavelength of the pH-sensitive fluorophore and/or an excitation wavelength of one or more other fluorophores in the analyte-sensitive substance. The analyte-sensitive substance could be disposed as part of a device that includes a light emitter used to provide the illumination, and such a device could be placed in contact with an environment of interest. Alternatively, the analyte-sensitive substance could be disposed on or within the environment of interest (e.g., beneath a skin surface) and could be illuminated by a light emitter that is separate from the analyte-sensitive substance, e.g., by a light emitter that is configured to illuminate the analyte-sensitive substance through a skin surface.

The method 700 additionally includes detecting light emitted from the analyte-sensitive substance responsive to being illuminated (704). As noted above in relation to illumination of the analyte-sensitive substance, a light sensor used to detect the responsively emitted light could be part of a device that includes the analyte-sensitive substance; alternatively, the analyte-sensitive substance could be separate from the light sensor and the light sensor could be configured to detect the light via a skin surface or through some other intervening space or material. An intensity, a spectrum, an intensity at one or more wavelengths, a polarization, or some other property of the responsively emitted light. For example, the intensity of light at an emission wavelength of the pH-sensitive fluorophore could be detected. Further, the intensity of light at emission wavelengths of one or more further fluorophores (e.g., one or more further pH-sensitive fluorophores) in the analyte-sensitive substance could be detected.

The method 700 additionally includes determining the concentration of the analyte proximate the analyte-sensitive substance based on the detected light (706). This could include using a formula, lookup table, or other method to determine the concentration based on a detected intensity of the light or based on some other detected property of the responsively emitted light. In some examples, the analyte-sensitive substance could include multiple different pH-sensitive fluorophores (e.g., a first fluorophore that increases fluorescence intensity over a range of pH values and a second fluorophore that decreases fluorescence intensity over the range of pH values) and the concentration could be determined based on a difference, a ratio, or some other detected properties of lights emitted from the multiple different pH-sensitive fluorophores. Determining a concentration based on a detected light (706) could include other operations.

The method 700 could include additional steps. For example, the method 700 could include determining a health state, a course of treatment, a dose and/or timing of administration of a drug, or some other information based on a determined concentration and/or detected optical properties. The method 700 could include indicating such detected or determined information using a user interface, a radio, or some other means. The method 700 could include emplacing the analyte-sensitive substance and/or a device that includes the analyte-sensitive substance on, within, or otherwise in contact with an environment of interest, e.g., by implanting the analyte-sensitive substance within a tissue, by penetrating a tissue with a probe that includes the analyte-sensitive substance, by mounting a device to a skin surface, or by some other method. Additional and/or alternative steps, or alternative embodiments of the listed steps, are anticipated.

Figure 8:
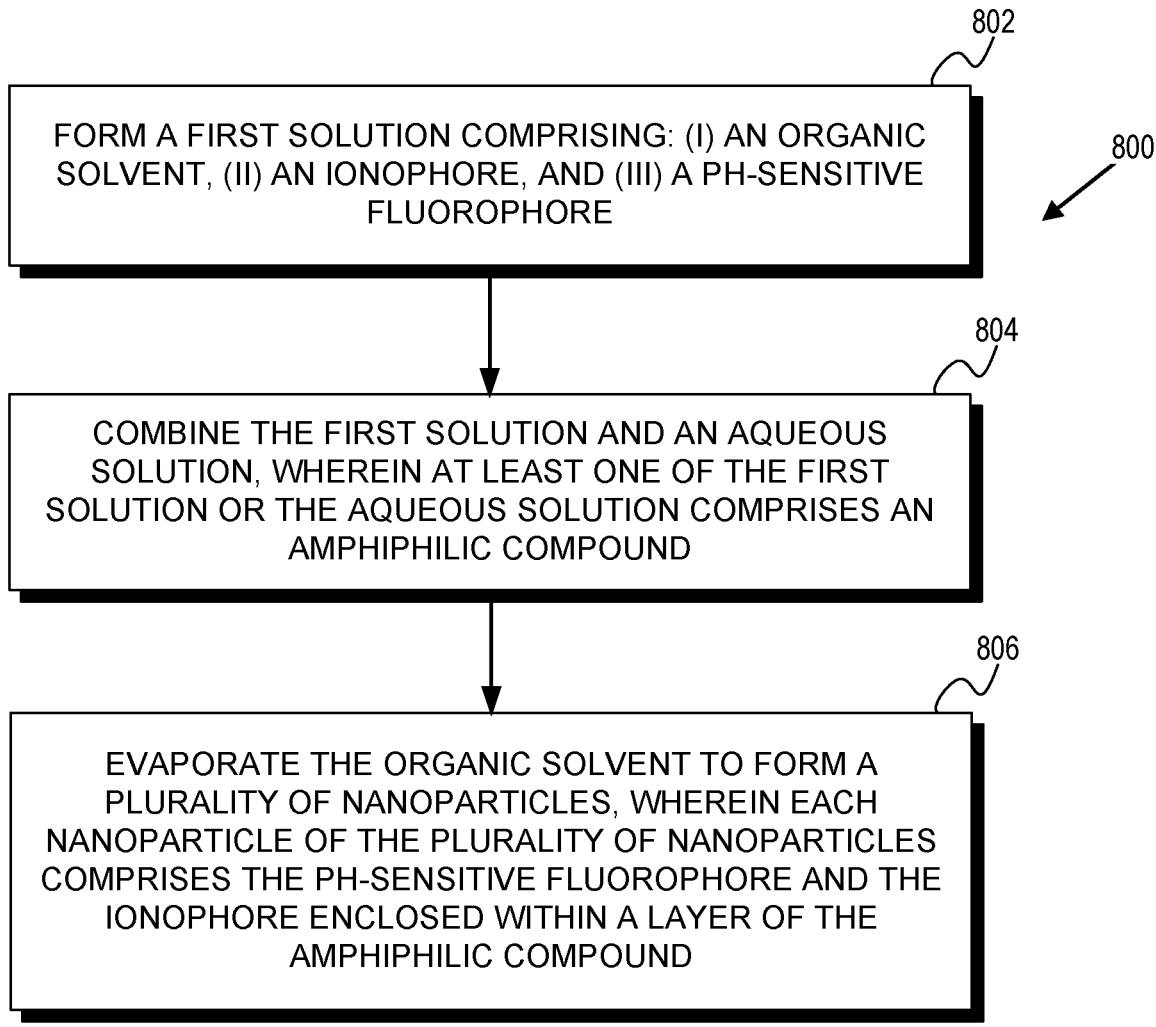
FIG. 8 is a flowchart of an example method.

FIG. 8 is a flowchart of a method 800 for creating a plurality of nanoparticles of an ion-sensitive substance as described elsewhere herein. The method 800 includes forming a first solution that includes (i) an organic solvent, (ii) an ionophore, and (iii) a pH-sensitive fluorophore (802). The solution could be formed using an organic solvent, e.g., tetrahyrdofuran (THF), dichloromethane (DCM), or some other nonpolar solvents. Correspondingly, the ionophore, the pH-sensitive fluorophore, and other elements of the solution could include hydrophobic materials. The solution could include additional elements, e.g., an ionic additive, a pH-sensitive quencher, an amphiphilic compound, or some other elements according to an application.

The method 800 additionally includes combining the first solution with an aqueous solution, wherein one of the first solution and the aqueous solution includes an amphiphilic compound (804). As noted above, the amphiphilic compound could be part of the first solution. Additionally or alternatively, the amphiphilic compound could be part of the aqueous solution. The first solution could be added to the aqueous solution in such a way that the organic solvent could be evaporated to form a plurality of nanoparticles that include a layer of the amphiphilic compound containing the hydrophobic elements of the first solution (e.g., the pH-sensitive fluorophore, the ionophore, a pH-sensitive quencher, an ionic additive). The formed nanoparticles could be micelles, liposome, or some other form of nanoparticle. This could include sonicating the aqueous solution while the first solution is added, vigorously mixing the combination of the first solution and the aqueous solution, or some other method of thoroughly mixing the first solution and the aqueous solution.

The method also includes evaporating the organic solvent to form a plurality of nanoparticles such that each of the nanoparticles includes the pH-sensitive fluorophore and the ionophore enclosed within a layer of the amphiphilic compound (806). This could include applying a vacuum to the combined first solution and aqueous solution. Additionally or alternatively, the dry air or nitrogen could be blown past the solution combined first solution and aqueous solution. Some other method could be used to remove the organic solvent.

The method 800 could include additional steps. The method 800 could include forming a polymer that contains the formed nanoparticles (e.g., a hydrogel or some other polymer material). The method 800 could additionally or alternatively include disposing the nanoparticles on a surface, e.g., a surface of an optical sensor, a surface of a sensor probe, or some other surface. The method 800 could be performed multiple times to produced multiple different types of nanoparticles (e.g., a first type of nanoparticle that includes a first pH-sensitive fluorophore and a second type of nanoparticle that includes a second pH-sensitive fluorophore); the multiple types of nanoparticles could then be disposed in a polymer or other material to form an analyte-sensitive substance. Additional and/or alternative steps, or alternative embodiments of the listed steps, are anticipated.

V. Conclusion

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method for forming an analyte-sensitive substance, the method comprising:

forming a first solution comprising: (i) an organic solvent, (ii) an ionophore, wherein the ionophore comprises a hydrophobic substance, wherein the ionophore is configured to provide a local pH within the analyte-sensitive substance related to a concentration of an analyte proximate the analyte-sensitive substance, and (iii) a pH-sensitive fluorophore, wherein the pH-sensitive fluorophore comprises a hydrophobic substance, wherein the pH-sensitive fluorophore is configured to fluoresce with a fluorescence intensity that increases or decreases as a function of the local pH over a range of pH values according to an intrinsic intensity function, wherein the intrinsic intensity function has a first rate of change of fluorescence intensity over the range of pH values;

combining the first solution and an aqueous solution, wherein at least one of the first solution or the aqueous solution comprises an amphiphilic compound; and evaporating the organic solvent to form a plurality of nanoparticles, wherein each nanoparticle of the plurality of nanoparticles comprises the pH-sensitive fluorophore and the ionophore enclosed within a layer of the amphiphilic compound.

2. The method of claim 1, wherein the aqueous solution comprises the amphiphilic compound, wherein combining the first solution with the aqueous solution comprises adding the first solution to the aqueous solution, and further comprising:

sonicating the aqueous solution while adding the first solution to the aqueous solution.

3. The method of claim 1, wherein the organic solvent is miscible in the aqueous solutions, and wherein combining the first solution and the aqueous solution comprises stirring the combined first solution and aqueous solution.

4. The method of claim 1, wherein the first solution further comprises a pH-sensitive quencher, wherein the ionophore comprises a hydrophobic substance wherein, the pH-sensitive quencher is configured to quench the pH-sensitive fluorophore to an extent that increases or decreases as a function of the local pH within the range of pH values, such that the pH-sensitive fluorophore in combination with the pH-sensitive quencher is configured to fluoresce with a fluorescence intensity that increases or decreases as a function of the local pH over the range of pH values according to a quencher-modified intensity function, wherein the quencher-modified intensity function has a second rate of change of fluorescence intensity over the range of pH values, wherein the second rate of change is greater in magnitude that the first rate of change, and wherein each nanoparticle of the plurality of nanoparticles comprises the pH-sensitive quencher enclosed within the layer of the amphiphilic compound.

5. The method of claim 1, wherein the first solution further comprises a further pH-sensitive fluorophore, wherein the further pH-sensitive fluorophore comprises a hydrophobic substance, wherein the further pH-sensitive fluorophore is configured to fluoresce with a fluorescence intensity that increases or decreases as a function of the local pH over the range of pH values according to a further intrinsic intensity function, wherein the further intrinsic intensity function has a third rate of change of fluorescence intensity over the range of pH values, and wherein either (i) the pH-sensitive fluorophore is configured to fluoresce with a fluorescence intensity that decreases as a function of the local pH over the range of pH values and the further pH-sensitive fluorophore is configured to fluoresce with a fluorescence intensity that increases as a function of the local pH over the range of pH values, or (ii) the pH-sensitive fluorophore is configured to fluoresce with a fluorescence intensity that increases as a function of the local pH over the range of pH values and the further pH-sensitive fluorophore is configured to fluoresce with a fluorescence intensity that decreases as a function of the local pH over the range of pH values, and wherein each nanoparticle of the plurality of nanoparticles comprises the further pH-sensitive fluorophore enclosed within the layer of the amphiphilic compound.

6. The method of claim 1, wherein the first solution further comprises an ionic additive, wherein the ionic additive comprises a hydrophobic substance, wherein the ionic additive comprises one of an anionic additive or a cationic additive, wherein the ionic additive is configured to one of raise or lower the local pH, and wherein an amount of the ionic additive in the analyte-sensitive substance is specified such that the range of pH values corresponds to a specified range of concentrations of the analyte proximate the analyte-sensitive substance, and wherein each nanoparticle of the plurality of nanoparticles comprises the ionic additive enclosed within the layer of the amphiphilic compound.

7. The method of claim 1, further comprising:
forming an analyte-permeable polymer, wherein forming an analyte-permeable polymer comprises forming the analyte-permeable polymer such that the plurality of nanoparticles are disposed within the analyte-permeable polymer.

* * * * *